Patented Nov. 2, 1937

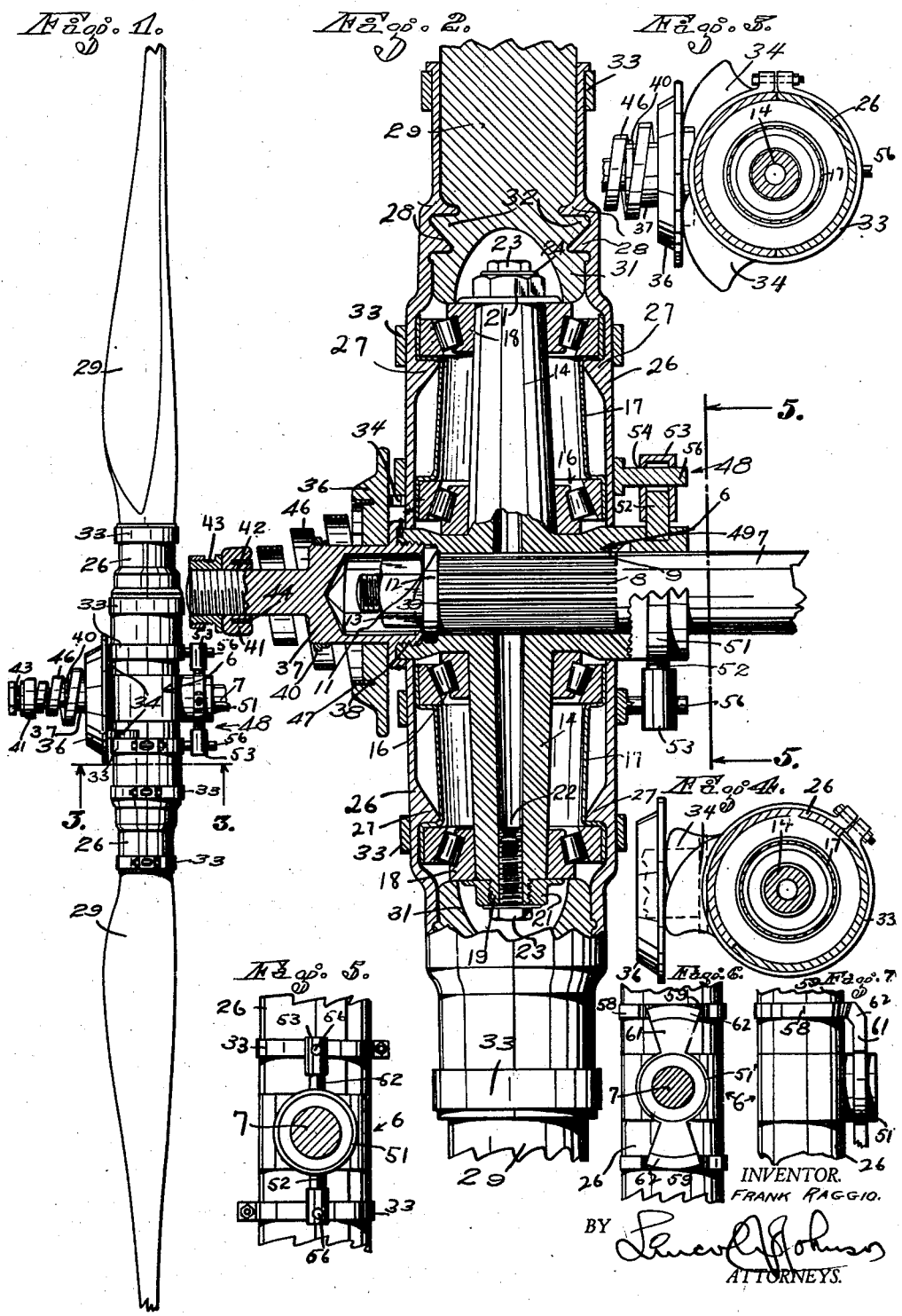

2,097,643

UNITED STATES PATENT OFFICE 2,097,643

ADJUSTABLE PITCH PROPELLER

Frank Raggio, San Francisco, Calif.

Application April 21, 1931, Serial No. 531,696
Renewed April 22, 1935

9 Claims. (Cl. 170—162)

This invention relates to propellers for airplanes, flying machines, or boats and the like.

An object of the invention is to provide a propeller which will automatically vary the pitch of its blades to produce a nearly constant thrust at any speed of flight, also regulate the speed of the engine by turning the blades axially to that pitch angle which produces constant aerial resistance to rotation, independent of changing currents of air or variation of speed of flight.

Other objects and advantages are to provide a propeller for airplanes, flying machines or boats and the like, that will be superior in point of simplicity, inexpensiveness of construction, positiveness of operation, and facility and convenience in use and general efficiency.

In this specification and the annexed drawing, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

The invention is clearly illustrated in the accompanying drawing wherein:

Fig. 1 is a side view of the propeller, constructed in accordance with my invention.

Fig. 2 is a vertical sectional view of the propeller.

Fig. 3 is a cross sectional view of the propeller, the section being taken on the line 3—3 of Fig. 1.

Fig. 4 is a cross sectional view of the propeller showing the cams and sockets turned to compress the plate holding spring of the counteracting mechanism of the propeller.

Fig. 5 is a fragmental end view of the propeller viewing in the direction of the arrows 5—5 on the section line in Fig. 2.

Fig. 6 is a sectional detail view of a modified form of connection between the sockets.

Fig. 7 is a side view of the modified connection.

Attempts heretofore made to produce propellers of automatically adjustable pitch, did not meet with success in view of the fact that the special design of the blades involved the reducing of the efficiency of the propeller; also great difficulties of assembly arose, and the turnable blades could not be held in place under the large centrifugal forces generated by the high speed rotation of the propellers.

In the embodiment of the invention herein described, substantially the usual blade design may be used, the propeller can be assembled with great ease and facility, and the blades are readily held and are freely moved when automatically adjusted by the air pressure, regardless of the centrifugal force exerted thereon.

In carrying out my invention I make use of a hollow hub 6 adapted to be secured over the end of an engine shaft 7. The interior of the hub 6 conforms to the shape of the end of the shaft 7. If the shaft 7 has a tapered end the hub 6 is made to fit thereover. In the present illustration the end of the shaft 7 is splined at 8 and the bore 9 of the hub 6 fits over the splined end 8. The outer end of the hub 6 is countersunk at 11 and a collar 12 of a nut 13 bears against the inner wall of the countersunk end 11 so as to securely hold the hub 6 on the shaft 7. The shaft 7 has a reduced threaded stub on its outer end on which the nut 13 is threaded.

From the outer periphery of the hub 6 extend radial spindles 14 in diametrically opposite directions to each other. The spindles 14 are tapered from the inner toward the outer ends thereof. Over the inner end of each spindle 14 fits an anti-friction thrust bearing 16, on the outer race of which is set a bearing housing 17. The bearing housing 17 is shouldered or flared at its opposite ends thereof.

One end of the housing 17 fits over the outer race of the bearing 16, and the other end thereof supports the outer race of another anti-friction thrust bearing 18, the inner race of which latter is suitably secured onto the outer end of the spindle 14. On the outer end of each spindle 14 is formed a reduced threaded shank 19 on which is threadedly secured a flanged lock nut 21. The outer zones of the flange of the lock nut 21 bear upon the top of the inner race of the bearing 18. A central axial threaded hole 22 is drilled into the shank 19 and the spindle 14. A lock bolt 23 is screwed into the hole 22 so that the flanged head 24 of the bolt 23 bears against the top of the lock nut 21 and firmly holds the same in place.

A socket 26 is disposed around the outer periphery of each housing 17. Each socket 26 is split longitudinally to form two semicylindrical half shells, and the shells have retaining ribs or protrusions 27 on the inner peripheries thereof to engage the underside of the outer shoulder of the housing 17. Thus, after the socket 26 is suitably clamped over the housing 17, it is positively held against axial displacement, but it is freely rotatable with the housing 17 around the bearings 16 and 18 on the spindle 14. The sockets 26 extend to the outer periphery of the hub 6. The outer end of each socket 26 is reduced in diameter and is provided with a plurality of retaining shoulders 28 at the root of the reduced end.

A propeller blade 29 of the usual aerofoil cross section, and substantially of the usual design, is fixedly secured in each socket 26. Each blade 29 has a cylindrical shank 31 on its inner end, which shank 31 has external retaining ribs 32 thereon complementing and fitting against the retaining shoulders 28 of the socket 26. The root end of each blade 29 abuts the end of each spindle 14 and is in axial alignment therewith.

The socket 26 is fitted over the housing 17 and over the shank 31 of the propeller blade 29 and then a plurality of suitable clamp rings 33 are secured over the outer periphery of the socket 26 to fixedly clamp the latter onto the said housing and the said blade shank.

In order to counteract the turning movement of the sockets 26 caused by the air pressure exerted on the blades 29, a peripheral cam 34 is provided on the outside of each socket 24 near the outer end of the hub 6. The cams 34 engage on a cam plate 36 which latter is axially slidable on a hub cap 37. The hub cap 37 is hollow at its inner end and it is externally threaded at 38 for engagement with internal threads in the countersunk end 11 of the hub 6. An annular collar 39 of the cap 37 overlaps the outer periphery of the end of the hub 6 and is locked against rotation by a suitable lock wire. The outer end of the cap 37 is reduced in diameter and is externally threaded to receive a cup 41 thereon. A central threaded hole 42 of the cup 41 is threaded on the said reduced cap end and is held in position by a suitable lock nut 43 bearing against its outer face. The cup 41 is dished at 44 to accommodate the smaller end of a tapered coil spring 46 therein. The coil spring 46 is disposed around the cap 37 and its wider end bears against a dished portion 47 in the adjacent face of the plate 36.

When the sockets 26 are turned in opposite directions to each other, the cams 34 are brought into engagement with the free face of the plate 36 to urge the same away from the socket 26. This movement of the plate is resisted by the spring 46 so as to counteract the turning movement of the sockets 26. The tension of the spring 46 is readily adjustable by the adjustment of the cup 41 on the threaded end of the cap 37. The movement of the plate 36 is limited by an abutment collar 40 threaded on the cap 37 and adjustable to a selected distance from the plate 36.

To obtain a best average pitch of the entire propeller it is necessary that the blades 29 therefore be adjusted in opposite directions to each other. This is accomplished by a connecting mechanism 48 disposed on the inner end of the hub 6. On the said inner end of the hub 6 is formed an annular groove 49 in which is rotatably confined an annular ring 51. From the ring 51 extend radial stub shafts 52 in diametrically opposite directions to each other. On the outer end of each shaft 52 is a sliding cap sleeve 53, through the outer zones of which latter are drilled aligned holes 54. A fixed pin 56 extends from a clamp 33 of each socket 26, at right angles to the socket, and into the holes 54. The pins 56 are slidable in the holes 54 transversely to the sleeves 53 and the sleeves 53 are slidable and rotatable on the shafts 52 so as to constitute universal connections between the ring 51 and the sockets 26.

When one of the sockets 26 is turned in one direction, it turns its pin 56 therewith. The moving pin 56 not only turns the adjacent sleeve 53 but also exerts a turning moment on the ring 51 through the adjacent shaft 52. The turning of the ring 51 causes the other shaft 52 to move relatively to the socket, and the other sleeve 53 conveys the force to the other pin 56 whereby the other socket 26 is turned with the first mentioned socket 26, but in an opposite direction. The turning movement of the sleeves is limited by the maximum compression of the spring 46 which at a certain degree of compression prevents any further outward movement of the plate 36 and of the cams 34, and the farthest limit of socket movement is the abutment collar 40.

A modified embodiment of the connection of the sockets 26 with each other, is shown in Figs. 6 and 7. In this instance a portion of a clamping ring 58 on each socket 26 is provided with a segmental bevel gear section 59. The teeth of each gear section 59 are in mesh with a bevel gear sector 61, the latter being formed on a bracket 62 extended radially from the ring 51'. There are two such brackets 62 on the ring 51' diametrically opposite to each other. When a socket 26 is turned, the gear section 59 thereon causes the sector 61 to move on an arc so as to turn the ring 51', thereby turning the other bracket 62 and the other sector 61 in opposite direction to the first sector movement. The second sector 61 thus moved, will convey a turning movement to the other socket 26 oppositely to the first socket 26.

In operation the change of air pressure on the blades 29 causes the same to turn around the longitudinal axes thereof. It is to be noted that the blades 29 have the usual aerofoil cross section, and have greater areas on the following sides of their axial center line than on the leading side. The aerofoil is so formed that the center of lift is suitably offset relatively to the center line. Correspondingly the thrust center of the blades 21 are offset toward the following sides of the blades with respect to the pivotal axis of the respective blades. This condition creates a turning moment around the said center line when the pressure on the blade is increased. Inasmuch as the blades 29 are fixedly connected to the sockets 26, the said turning moment causes the turning of one socket 26. The connecting mechanism 48 conveys the movement of one socket 26 to the other, but in opposite direction. The oppositely moving cams 34 then engage the plate 36, which progressively retards the cam movement and the turning of the sockets and the blades. In this manner excessive variation of blade pitch is obviated, because a certain degree of unbalanced force must be caused by the change of air pressure conditions before the counteracting force of the spring 46 is overcome to a desired extent. Whenever the air pressure on the blades becomes normal the spring 46 and the plate 36 assist in returning the propeller blades to the normal positions thereof. The blades vary their pitch exactly in proportion to the aerial pressure, and the universal connections between the opposed sockets in combination with counteracting cam mechanism, equalize the varying pitch of the opposite blades to a uniform average pitch, according to the average aerial pressure on all the blades at one instant.

During the entire operation of the propeller the self adjustment of the propeller blades is sufficiently sensitive to varying aerial pressures to result in efficient operation under all circumstances, at the same time the turnable supporting of the blades on the hub is such that it does not materially increase the weight of the propeller, yet it positively prevents the throwing of the blades from the sockets under the great centrifugal force to which a propeller is usually subjected. In view of the offset of the thrust sections of the blades from the axial center line toward the respective following sides increased air pressure will cause decrease of the pitch of the blades. When air pressure on the blades is decreased the spring 46 and the plate 36 urge the blades toward increased pitch positions. It is to be noted that the blades are freely floating on the ends of the spindles 14 of the hub and are normally at the maximum increased pitch position, and that the blades are caused to move from the normally increased position toward a decreased pitch position by the pressure of the air on the blades, and this turning moment is reduced by the combination of the cam, the cam plate, and the spring bearing against the cam plate, as heretofore described. In other words on account of the propeller being balanced between a spring and the pressure of the air on the blades "fluttering" of the blades is entirely prevented and thereby the propeller is rendered not only more efficient but the blades in the propeller herein are much quicker in operation than blades heretofore used.

Having thus described this invention, what I claim and desire to secure by Letters Patent is:

1. A propeller of the character described comprising a hub, radial spindles extended from the hub, a socket on each spindle extended beyond the outer end of the latter, means rotatably secured on each spindle on which the socket is journaled so as to be held against displacement radially to the hub; a propeller blade in each socket abutting the end of the spindle, each socket being split and having internal engaging elements formed therein, the inner end of each blade being formed to complement and engage said elements, means to fixedly clamp the sockets over said rotatable means and over the ends of the respective blades; means on the hub common to all the sockets to convey the turning movement of one socket to the other, but in an opposite direction.

2. In a blade mounting for propellers of adjustable pitch, the combination with a hub and a spindle radially extended from the hub, of antifriction bearings on the spindle, a housing journaled on the bearings to hold the same in position, means on the spindle to prevent the movement of the housing and of the bearings axially to the spindle, a peripherally ribbed end on the blade, a socket having securing elements on its inner periphery to fixedly engage the said housing at one end and to engage at its other end with the ribbed end of the blade, said socket being axially split, and means to fixedly clamp the split socket sections over the said housing and over said blade end.

3. A variable pitch propeller, having blades, the pitch of which is adjusted or readjusted automatically by the air pressure arising while the propeller rotates, comprising, in combination with said blades and with hollow portions in their hub ends, of spindles projecting radially outward from the hub of the propeller and engaging in abutting relation with the hollow hub ends only of the blades; means on the propeller hub for transmitting turning movement of one blade to the other; an eccentric cam arranged on the outside of each blade at its hub end; and a spring actuated cushioning mechanism arranged coaxially with the propeller axis and bearing against the cams on the blades to counteract the turning of the blades around their axes.

4. A variable pitch propeller, having blades, the pitch of which is adjusted or readjusted automatically by the air pressure arising while the propeller rotates, comprising, in combination with said blades and with hollow portions in their hub ends, of spindles projecting radially outward from the hub of the propeller and engaging in abutting relation with the hollow hub ends only of the blades; means on the propeller hub interconnecting said blades for transmitting turning movement of one blade to the other; an eccentric cam arranged on the outside of each blade at its hub end; a cam plate slidably mounted on the propeller hub and arranged to move coaxially with the propeller axis; and a spring bearing against the cam plate and adapted to transmit the expansive force of said spring thru the cam plate and cams to the blades in such a manner that this force counteracts the turning of the blades around their axes.

5. In a propeller, a hub having opposed spindles for mounting propeller blades; a housing mounted on each spindle, there being rotary bearings adjacent the outer and inner ends of each spindle to permit rotation of the housing relative to said spindles; a blade arranged adjacent the end of each spindle in axial alignment therewith; and a split socket clamped around the housing on each spindle and the adjacent blade to hold the axes of the blade and spindle in alignment.

6. A device of the character described comprising, a rotatable propeller shaft; a hub borne by said shaft; a disc slidably mounted on the shaft; a spring engaging said disc and tending to resist relative movement of the disc on the shaft; separate propeller blades borne by said hub, the pitch of which is adjusted or readjusted automatically by the air pressure; a cam on the outside of each blade at its hub end engaging said disc to counteract the turning of the blades around their axes; and means of connection between the hub and the hub end of each propeller blade for transmitting the variable pitch of one blade to the other.

7. A device of the character described comprising, a rotatable propeller shaft; a hub fixedly mounted on said shaft, and having radially extended spindles thereon; separate propeller blades borne by the spindles on said hub, the pitch of said blades being adjusted or readjusted automatically by air pressure as the propeller blades rotate; a member slidably mounted on the shaft; yieldable means engaging said member to resist axial movement of the member on the shaft; eccentric means on the outside of each blade at its hub end engaging said member to counteract the turning movement of blades around their own axes; and means of connection between the hub and the hub end of each blade for transmitting the variable pitch of one blade to the other.

8. A device of the character described comprising, a rotatable propeller shaft; a hub fixedly mounted on said shaft, and having radially extended spindles thereon; separate propeller blades borne by the spindles on said hub, the pitch of said blades being adjusted or readjusted automatically by air pressure as the propeller blades rotate; a member movable axially on the axis of rotation of the hub; yieldable means engaging said member to counteract axial movement thereof; eccentric means on the outside of each blade at its hub end engaging said member to counteract the turning movement of blades around their own axes; and means of connection between the hub and the hub end of each blade for transmitting the variable pitch of one blade to the other.

9. A variable pitch propeller, having blades, the pitch of which is adjusted automatically by the air pressure on the blades as the same rotate, said blades being oscillatingly supported at one end only on spindles extending radially outward from a driving hub; means on the hub for transmitting the turning movement of one blade to the other; an eccentric cam arranged on each blade near its hub end; and a spring actuated cushioning mechanism arranged coaxially with the hub axis and bearing against the blade cams to counteract the turning of the blades around their own axes.

FRANK RAGGIO.